Patented Dec. 21, 1948

2,456,691

UNITED STATES PATENT OFFICE 2,456,691

PROCESS FOR TREATING FATTY MATERIALS

William R. Eipper, Philadelphia, Pa.

No Drawing. Application January 27, 1948, Serial No. 4,697

11 Claims. (Cl. 260—405.6)

This invention is a method of raising the melting points of natural fats containing esters of oleic acid and its homologues by isomerization, and this application constitutes a continuation-in-part of my prior applications entitled "Non-blooming chocolate and method of preparing same," filed June 25, 1941, and identified by Serial No. 399,725, "Process for treating fatty materials," filed June 15, 1942, and identified by Serial No. 447,171, and "Process for treating fatty materials," filed January 3, 1946, and identified by Serial No. 638,922, all of which applications are now abandoned.

It has long been desirable to raise the melting point of natural fats and especially those which, at ordinary temperatures, are liquid or semi-solid, in order to prevent rapid deterioration of such fats without resorting to refrigeration. This is particularly true of fats used as foodstuffs or in the preparation of foodstuffs such as lard, chocolate, cocoa butter, and the like.

One object of the present invention is to provide a process by which the melting point of glyceryl esters of oleic acid, and of natural fats containing glyceryl esters of oleic acid and its homologues may be raised by converting the glyceryl esters of oleic acid, and its homologues contained in said fats, to esters of elaidic acid and to the corresponding isomers of the homologues by isomerization.

In known isomerization processes employed in raising the melting points of fats, particularly edible fats, serious difficulty has been experienced due to loss of natural flavor and aroma in the treated fat. This is due in some instances to the high temperatures to which the fat is subject during processing and in other instances to prolonged contact of the fat with certain catalysts which greatly impair or tend to destroy or contaminate the natural flavor of the fat. Delicately flavored fats such as lard, chocolate, cocoa butter, and the like particularly, are susceptible to loss of flavor and contamination due to these causes, namely, high temperature and prolonged contact with catalysts, which subject the fat under treatment to oxidizing influences that are directly responsible for the modification or destruction of the original flavor or taste.

Another object of the invention, therefore, is to provide an isomerization process of the character described which is particularly adapted for raising the melting point of edible fats without destroying or impairing the natural flavor or aroma thereof. This, as will be subsequently noted, is accomplished by the total exclusion of those physical and chemical factors which are responsible to a large extent for the unsatisfactory results of known procedure in isomerization.

A further object of the invention is to provide an isomerization process which is applicable generally to natural fats regardless of whether they are solid, liquid, or semi-solid at normal temperatures, and which process is carried out at temperatures and at a speed of reaction such as to insure retention of the natural flavor and aroma of the fats, and without other attending detrimental results which characterize known isomerization procedure.

Another object of the invention is to provide an isomerization process applicable for treating chocolate, cocoa butter, and similar chocolate products to raise the melting point thereof whereby to inhibit the formation of fat and sugar bloom when the chocolate or chocolate products become subject to extreme summer temperatures or humid atmosphere.

A further object of the invention is to provide a catalyst for use in isomerization processes generally which will insure a speedy reaction at relatively low temperatures and in which the catalyst is quickly and thoroughly dissipated so that the natural flavor and aroma of the fat being processed are not contaminated or destroyed. More particularly, the invention contemplates the use of a catalyst comprising an aqueous solution of nitrous acid dispersed or dissolved in a water-miscible organic fat solvent.

A further object of the invention is to increase as much as possible the interface contact between the fat and the catalyst by dispersing the glyceryl esters of oleic acid or the fat to be treated in a body of organic fat solvent which is miscible with the solvent in which the aqueous solution of nitrous acid is dispersed.

These and other objects of the invention will become apparent from the following specification wherein I have described in detail preferred embodiments of the invention.

As previously indicated, the process forming the subject matter of my invention comprises generally treating a fat with nitrous acid as a catalyst under conditions which will insure isomerization of the oleic acid esters of the fat to elaidic acid esters with the resulting rise in the melting point of the fat. As is well known, nitrous acid is very fugitive in any state of dilution, from the instant of liberation. The only known available form, prior to this invention, in which it can be used is in the nascent form in a chilled water solution which is obviously unsuitable for treatment of fatty materials. Up to the present time, it has been impossible to employ nitrous acid in a practical capacity for isomerization of fats due to the rigid and very narrow physical limitations presented by the necessity of conducting such an operation in water solution, in which the fats are insoluble, and at temperatures which would render most fatty substances either solid or highly viscous, thereby permitting only a small degree of isomerization. This difficulty is particularly apparent in respect to the isomerization of fats which at normal temperatures are solid or semi-solid. I have, however, discovered that if an aqueous solution of nitrous acid is dissolved or dispersed in a water-miscible organic fat solvent made such as hereinafter described, such dispersion or solution of nitrous acid may be used effectively as a catalyst in the elaidination of glyceryl esters of oleic acid and of natural fats containing such esters at temperatures between 0° C. and 25° C.

I give below, by way of illustration, a partial list of organic fat solvents which may be employed in the present process, namely:

| Type | Miscibility with Water |
| --- | --- |
| Aliphatic and Aromatic Hydrocarbons: | |
| Pentane | No |
| Hexane | No |
| Heptane | No |
| Cyclohexane | No |
| Benzene | No |
| Toluene | No |
| Halogenated Hydrocarbons: | |
| Dichloropentane | No |
| Propylene dichloride | No |
| Tetrachlorethane | No |
| Trichlorethane | No |
| Chlorbenzene | No |
| Fluorbenzene | No |
| Chlortoluene | No |
| Fluortoluene | No |
| Trichlorethylene | No |
| Ketones: | |
| Acetone* | Yes |
| Acetylacetone | Yes |
| Diacetone* | Yes |
| Tetraethylacetone | Yes |
| Diethyl ketone | Yes |
| Methylethyl ketone | No |
| Cyclohexanone | No |
| Methylhexanone | No |
| Acetophenone | No |
| Ketone esters: Ethylacetoacetate | No |
| Ethers: | |
| Ethyleneglycol monoethylether* | Yes |
| Ethyleneglycol monomethylether* | Yes |
| Ethyleneglycol diethylether | Yes |
| Ethyleneglycol dimethylether | Yes |
| Diethyleneglycol monoethylether* | Yes |
| Diethyleneglycol monomethylether* | Yes |
| Butyric ether | No |
| Propyl ether | No |
| Ketone ethers: | |
| Acetal ethylether | Yes |
| Methyl ethoxyethylether | Yes |
| Esters: | |
| Amyl acetate | No |
| Ethyl acetate | Yes |
| Methyl acetate* | Yes |
| Octyl acetate | No |
| Methyl amyl acetate | No |
| Methyl acetoacetate | Yes |
| Methylene diacetate | Yes |
| Isopropyl acetate | Yes |
| n-butyl butyrate | No |
| Ethyl butyrate | No |
| Butyl formate | No |
| Ester ethers: | |
| Ethyleneglycol monoethylether acetate | Yes |
| Diethyleneglycol monoethylether acetate* | Yes |
| Ethyleneglycol monomethylether acetate* | Yes |
| Diethyleneglycol monomethylether acetate* | Yes |

The foregoing list is not complete, but is merely given as an indication of the wide range of selection of fat solvents which may be utilized in the present process. All liquid organic fat solvents may be used in the process as hereinafter described for the purpose of dissolving the fat or the glyceryl esters of oleic acid to be treated. In respect to the fat solvent which is employed for dissolving or dispersing the aqueous solution of nitrous acid to form the catalyst mixture, it is necessary that the fat solvent be miscible with water, either completely or to an extent sufficient to absorb and retain without separation or stratification water up to approximately 15% by volume. With this in mind, I have indicated on the above list solvents which are miscible with water to this extent by the legend "Yes" under the column headed "Miscibility with Water." Where the legend "No" appears in said column, it is an indication that the fat solvent so designated is not water-miscible, or is water-miscible only to an extent insufficient to retain without the separation, the required percentage of water. The liquid organic fat solvents are of course, all inert to nitrous acid in the presence of the fatty substance being isomerized. Furthermore, the liquid organic fat solvents which are not water-miscible per se may be used to disperse the fat since the water-miscible solvent present in the nitrous acid dispersion will function as a coupling agent between the two solutions and make them readily and completely miscible with each other.

It should be noted that the liquid organic fat solvents which are not per se water-miscible may be utilized, together with liquid organic fat solvents which are completely miscible with water, to form solvent or dispersion media for the aqueous solutions of nitrous acid. In such instances, the liquid organic fat solvent which is completely miscible with water functions as a coupling agent between water and the liquid organic fat solvent which is per se not miscible with water to form a homogeneous solvent or dispersion medium which will retain the aqueous solution of nitrous acid without separation or stratification.

With this in mind, I have indicated by an asterisk on the foregoing list those liquid organic fat solvents which are completely miscible with water. It will be understood therefore that solvent or dispersion media for the aqueous solution of nitrous acid may be formed by mixing any one of the fat solvents indicated by an asterisk on the foregoing list, with any desired proportion of water. As previously indicated, the percentage of water present in the dispersion media for the aqueous solution of nitrous acid is preferably kept within the range of 1% to 15% by volume of the mixture. Thus, a dispersion medium for the aqueous solution of nitrous acid may be made by mixing any desired proportion of water ranging between 1% and 15% with the required percentage of any one of the fat solvents indicated by the asterisk on the foregoing list. Similarly, if desired, any two or more of the fat solvents indicated by an asterisk may be combined in proper proportion with the desired proportion of water to form desired dispersion media.

It should be noted, however, that dispersion media for the aqueous solution of nitrous acid may be compounded by employing any of the fat solvents included on or represented by the foregoing list, even though per se it has little or no power to absorb water, if such fat solvent is combined in proper proportions with one of the fat solvents indicated as being completely miscible with water. By way of illustrating the manner in which the non-water-miscible fat solvents may be thus employed, I give the following examples, namely:

| | Percent |
|---|---|
| Acetone | 75 |
| Amyl acetate | 20 |
| Water | 5 |
| Acetone | 75 |
| Acetophenone | 15 |
| Water | 10 |
| Ethylene glycol monoethyl ether | 70 |
| Ethyl acetoacetate | 18 |
| Water | 12 |
| Ethylene glycol monomethyl ether | 70 |
| Ethyl acetate | 15 |
| Water | 15 |
| Acetone | 78 |
| Chlortoluene | 15 |
| Water | 7 |
| Diacetone | 79 |
| Cyclohexanone | 12 |
| Water | 9 |

It will be understood, of course, that the water absorbed by or mixed with the liquid organic fat solvents to form the solvent or dispersion media as illustrated above is for the purpose of forming the nitrous acid when gaseous nitrous acid anhydride or a gaseous mixture of NO and $NO_2$ is delivered to or developed within the mixture of solvent and water. Nitrous acid anhydride or a gaseous mixture of NO and $NO_2$ may be developed and introduced into the liquid dispersion media by any known direct or indirect method.

The development of the nitrous acid in the dispersion medium may be conveniently accomplished at temperatures sufficiently below 0° C. to insure rapid formation of nitrous acid since all of said liquid organic fat solvent mixtures, by judicious blending, will provide aqueous mixtures of the solvent which will remain fluid and give admirable results under operating temperatures well below 0° C. In view of obvious difficulties from a standpoint of procedural technic incident to the development of the nitrous acid within the solvent or dispersing media by direct methods, I prefer to employ the indirect method and introduce the nitrous acid anhydride or gaseous mixture of NO and $NO_2$ into the dispersing media from an external source.

It is apparent from the foregoing that due to the particular physical properties of the respective solvents included in the nitrous acid dispersing mixtures, the percentage of absorbed water may vary appreciably. The 1%, 5%, 7%, 9%, 10%, 12%, and 15% of water in the foregoing examples are purely arbitrary figures that I used. The actual amounts of water which can be conveniently used in the solvent or dispersion media are made to fall within relatively narrow limits by two factors. The low limit is dictated by the practical consideration of overall time to be devoted to the process, it being found that when the water content is reduced appreciably below 5%, it is necessary to prolong the time during which the anhydride or the gaseous mixture of NO and $NO_2$ is run through the mixture to an extent that makes the process as a whole uneconomical. While the process is thoroughly operable with percentages of water as low as 1%, economical procedure demands that the percentage of water be not less than 5%. The upper limit of water content is dictated by the low temperature at which the nitrous acid is developed in the dispersing medium. In many instances, it is found desirable to conduct this phase of the reaction at temperatures well below 0° C. and it has been found that if the water content is raised appreciably above 15% it interferes materially with the degree to which the temperature of the reaction may be lowered without causing stratification or solidification of the medium. Considering all factors, therefore, it has been found that the most desirable range of percentage for water content of the medium is between 5 and 10%.

It is of course to be understood that regardless of the specific percentage of water present in a particular solvent or dispersing medium, relatively weak or relatively strong mixtures of nitrous acid may be produced as occasion requires. For example, I may prepare a small amount of strong catalyst solution and then dilute it with additional amounts of liquid organic solvent for use. Furthermore, it is of course apparent that the degree of concentration of the nitrous acid solution in a given mixture may be varied or controlled by the amount of nitrous acid generated in the mixture at the time of preparation thereof. In either event the degree of concentration of the nitrous acid solution may be gauged by its blue color or in any other manner known to those familiar with the art.

Having described the method of producing my catalyst medium comprising an aqueous solution of nitrous acid dispersed in a water miscible fat solvent medium, I will now describe the isomerization process in which said catalyst may be utilized.

As previously stated, my process is applicable generally to glyceryl esters of oleic acid as well as to fats having natural oleic acid esters and their homologues therein, and inasmuch as the rise in the melting point is due to the conversion of the oleic acid esters into elaidic acid esters, it is obvious that in general the extent to which the melting point of a fat is raised by this process, is dependent upon the relative percentage of natural oleic acid esters in said fat; that is to say, the larger the percentage of oleic acid esters in the fat, the greater will be the rise in melting point. Generally, the process entails reducing the fat to a liquid phase if it is normally solid or semi-solid. This may conveniently be done by dissolving the fat in a suitable solvent such as any of the liquid organic fat solvents included on the foregoing list. Here again the solvents may be used individually or appropriate mixtures thereof may be employed, the solvents or mixtures thereof being used in quantities to insure a homogeneous fluid fat solution. The temperature of the fat solution is then brought to approximately 15° to 20° C. and the fat is then isomerized by bringing it in contact with the catalyst mixture of nitrous acid and liquid organic fat solvent, hereinbefore referred to. The catalyst solution may be introduced into the fat solution with stirring or agitation, or the fat solution may be introduced into a container holding the catalyst solution. In either event the reaction is substantially instantaneous, the conversion taking place extremely rapidly but without other physical manifestation. The temperature of the reaction is controlled, by artifical cooling if necessary, to maintain the temperature below the point at which the treated fat will remain in solution. This temperature falls generally within the range of 15° C. to 20° C., but may, depending upon the nature of the fat being treated, and its percentage of glyceryl esters of oleic acid, range between 10° C. and 40° C. Under these conditions, the isomerized fat solidifies and the catalyst is quickly dissipated during the reaction so that only the small amount of water and fat solvent or solvents remain, from which the fat is easily recovered.

By way of a specific example of the application of the process to an edible fat, I take 110 grams of lard and dissolve it in approximately 300 cc.'s of one, or a mixture of, the fat solvents previously referred to, and stir or agitate until a smooth, uniform solution is obtained. The temperature of the fat solution is then brought to approximately 15° C. to 18° C. and held at this temperature. I then place in a second container about 250 cc. of the catalyst mixture prepared as hereinbefore described, and while constantly stirring the same, add to it the fat solution. Upon completion of the conversion, the isomerized fat may be easily removed from the surface of the mass and the solvent recovered in the usual manner, under vacuum if desired.

Similarly, the process is applicable to chocolate or cocoa butter, and to a 110 gram batch of cocoa butter substantially 300 cc. of fat solvent are employed for making the initial fat solution. The temperature of the fat solution is then brought to approximately 15° C. to 18° C. and stirred to uniform consistency. The fat solution as thus prepared is then poured into a receptacle containing about 250 cc. of the prepared catalyst mixture, and when the conversion is completed, the solid isomerized cocoa butter is removed from the surface of the mass and the solvent recovered in the usual manner. It will be appreciated that the temperature of the reaction and the emperature necessary to drive off the solvent liquids with the entrained moisture are well below the temperature to which chocolate and cocoa butter may be heated without injuring the delicate taste and aroma thereof (approximately 65° C.)

In respect to a fat which is liquid at normal temperatures, a lesser quantity of solvent is required. The isomerization procedure otherwise is the same as for a fat which is solid or semisolid at normal temperatures, such as for lard, cocoa butter, and the like.

The process as applied to other fats is carried out in the same general manner, the amounts of fat solvent employed varying slightly with the normal consistency of the fat to be treated. It is desirable to employ sufficient solvent to insure a substantially fluid, smooth, fat solution, so that a maximum interface contact area for the catalyst is insured. It should be noted that while I have described the process as including introducing the fat solution into a receptacle containing the catalyst mixture, the conversion step may be performed by introducing the catalyst mixture into the fat solution. However, I have found that the step of introducing the fat solution into the catalyst vessel results in a more satisfactory reaction and a more desirable product and I attribute this improved result to the fact that this procedure insures there being a predominant amount of catalyst present at the point of reaction at all times.

By way of illustrating the effectiveness of the process as described, I list below the melting points of representative fats after treatment in the manner herein described:

| | °F. |
|---|---|
| Cocoa Butter | 110 to 115 |
| Lard (approximately) | 104 |
| Chocolate | 110 to 115 |

It should here be noted that while I have referred to temperatures between 15° and 20° C. prevailing at the time of isomerization, these temperatures are but indicative of what may be employed, and I have found that operating temperatures throughout the range of 10° C. to 40° C. may be conveniently and effectively employed. Thus, a fat which is liquid at normal temperature can be isomerized at a relatively lower temperature than a fat which is solid at normal temperature, because such normally liquid fat will remain in solution at a temperature at which a normally solid fat will "freeze" out of solution.

The process as thus far described comprehends contacting the fat solution at a temperature within the range of 10° C. to 40° C. with the catalyst mixture at any temperature below that at which the nitrous acid is effective, as such, and is thoroughly practical and completely operative within these broad boundaries. There is a further development of the process, however, which is of particular advantage when processing extremely delicately flavored edible fats, which development entails the determination of proper temperatures for the fat solution and catalyst mixture to insure rapid dissipation of the nitrous acid at the time of the reaction. In determining the temperature of the fat solution and of the catalyst mixture, I take into consideration the relative amounts of these materials involved in the isomerization reaction to the end that the ultimate temperature of the reaction mass will be such as to induce rapid dissipation of the catalyst to thus reduce the time during which the nitrous acid is in contact with the fat. In other words, the temperature of the fat solution and of the catalyst mixture, respectively, should be such that when combined the temperature of the resulting mixture will desirably be at or above that which marks the upper limit of effectiveness of nitrous acid, as such. By way of example, I prefer to retain the nitrous acid mixture at a relatively low temperature such as −40° C. to −20° C. having in mind that when it is combined with the relatively large amount of fat solution at a relatively higher temperature, the nitrous acid mixture will be brought up to or above the temperature at which the acid will disintegrate. Thus, if one liter of fat solution at 20° C. is mixed with 100 cc. of catalyst mixture at −40° C. the resulting temperature of the reaction mass is approximately 15° C. which is convenient and effective from an operating standpoint.

It is to be emphasized that although the isomerized fat in each instance has an appreciably higher melting point as above pointed out, said isomerized fat is unadulterated and has the same general appearance, taste, odor, color, and other physical characteristics as the natural fat. This is notably true in respect to chocolate and cocoa butter in which the final product cannot be distinguished from the original product except that it will be found to have its softening and melting points closer together (approximately 40° C. to 44° C.), as compared with 26° C. to 33° C. for the natural fat.

It is, of course, apparent that isomerized fats as prepared by the above described process may be combined with the corresponding original natural fats to any desired proportions to provide a final product having a desired melting point. Thus, if the melting point of an isomerized fat is believed to be high for some particular use or purpose, the admixture with said isomerized fat of a proper percentage of the untreated fat will result in lowering the melting point. This is of particular importance in respect to chocolate, cocoa butter, and kindred products, inasmuch as the desired melting and softening points of different chocolate products vary considerably. Thus, when the isomerized cocoa butter as prepared above is incorporated into chocolate confections, coatings, and the like, or, for example, in milk chocolate to an extent such that the oleic acid ester content of the final product is reduced approximately to between 15% and 20%, it will be found that when such coating is applied to confections, these products will be immune to both fat and sugar bloom, even after long periods of exposure to humid and warm atmospheres due to the fact that the softening and melting points have been brought more closely together. It is, of course, understood that the suggested percentage of oleic acid ester content in the final product (15 to 20% of the total fat) may be raised or lowered as desired to meet particular conditions, and that when the percentage of transformed fat in the final product is increased beyond the level indicated, the softening and melting points will be correspondingly raised and will approach a common point more closely, thus permitting the final product to withstand excessive atmospheric and temperature conditions without deterioration.

It is important to note at this point that the isomerization process which I have discovered is characterized by several important aspects from a standpoint of treating edible fats, particularly chocolate. One of these is the fact that by using nitrous acid as a catalyst for the isomerization process in the presence of liquid organic fat solvents and dispersing media, but a mere trace of the catalyst is necessary to bring about a complete and rapid isomerization reaction, and the attending effects of which, if any, on the delicate taste of the fat or chocolate are so mild as to be negligible. The small amount of nitrous acid diluted by the relatively large amount of fat solvent precludes entirely the possibility of the fat or chocolate being contaminated by obnoxious odors or tastes from the catalyst, or the destruction or deterioration of the natural taste or flavor of the fat. The same important advantages are doubly realized by the almost instantaneous dissipation of the catalyst as isomerization occurs.

It is likewise important to note that a striking difference between this and known isomerization processes for treating fats is that in all previous efforts the isomerization could be arrested before completion, not because of any unique control methods but because of the ineffective or slower action of the catalyst used in such processes. In the present process no control other than maintained proper temperature is necessary. Whatever amount of fat product that has been conditioned for treatment is completely isomerized at once upon combining the fat and catalyst solutions and this is true whether it is a mere trace of a weak solution of nitrous acid or a relatively large amount of acid in concentrated solution. This is a distinct advantage from a commercial standpoint over all prior references in this field.

It should be noted that the adjustment of the oleic acid esters in the edible fats, such as chocolate, in the manner herein described, has still further advantages with reference to the quality of the final chocolate or confection. Oleic acid is the one offending member among the components of cocoa butter as well as all other fatty substances, that is responsible for the development of rancidity or staleness. Obviously, the less oleic acid ester there is in the final chocolate product, the less will be the tendency toward rancidity. In cases such as lard, where complete isomerization does not produce a finished product of too high a melting point, rancidity is arrested. The same holds true for most of the normally liquid fats. Furthermore, in the case of lard, it is to be noted that the isomerized lard is characterized by an appreciably higher smoke point.

In conclusion, it will be apparent that I have discovered an isomerization process for treating edible fats, such as lard, chocolate, cocoa butter, and the like, by which the oleic acid ester content thereof may be rapidly and completely converted into elaidic acid esters with a corresponding rise in the temperature of the softening and melting points of the material treated. When chocolate or cocoa butter is so treated, the finished product is permanently protected from both fat and sugar bloom throughout the full range of normal atmospheric conditions. Furthermore, such process is based upon the use of an entirely new catalyst in such reactions, namely, nitrous acid dispersed in water miscible organic fat solvent media, by reason of which I am able to realize the advantages noted, without any loss of flavor. I have described in detail preferred modifications of my process, and the appended claims point out more particularly the novel features thereof.

I claim:

1. The process of isomerizing a natural fat containing glyceryl esters of oleic acid comprising mixing a solution of said fat in a liquid organic fat solvent with a solution of nitrous acid in a water-miscible organic fat solvent, said solvents being miscible with each other and inert to the acid in the presence of said fat, and maintaining the temperature of the reaction below the temperature at which the isomerized fat will remain in solution.

2. The process of isomerizing a natural fat containing glyceryl esters of oleic acid comprising forming separate solutions of said fat and of an aqueous solution of nitrous acid in water-miscible liquid organic fat solvents that are miscible with each other and inert to the nitrous acid in the presence of the fat and then mixing said solutions together at a temperature within the range of 10 C. to 40 C.

3. The process of isomerizing a natural fat containing glyceryl esters of oleic acid comprising forming separate solutions of said fat and of an aqueous solution of nitrous acid in different water-miscible liquid organic fat solvents that are miscible with each other and inert to the nitrous acid in the presence of the fat and then mixing said solutions together at a temperature within the range of 10° C. to 40° C.

4. The process of isomerizing a glyceryl ester of oleic acid comprising mixing a solution of said ester in a liquid organic fat solvent with a solution of nitrous acid in a water-miscible liquid organic fat solvent, said solvents being miscible with each other and inert to the acid in the presence of said ester, and maintaining the temperature of the reaction below the temperature at which the isomerized ester will remain in solution.

5. The process of isomerizing lard comprising mixing a solution of said lard in a liquid organic fat solvent with a solution of nitrous acid in a water-miscible liquid organic fat solvent, said solvents being miscible with each other and inert to the acid in the presence of said lard, and maintaining the temperature of the reaction below the temperature at which the isomerized lard will remain in solution.

6. The process of isomerizing cocoa butter comprising mixing a solution of said cocoa butter in a liquid organic fat solvent with a solution of nitrous acid in a water-miscible liquid organic fat solvent, said solvents being miscible with each other and inert to the acid in the presence of said cocoa butter, and maintaining the temperature of the reaction below the temperature at which the isomerized cocoa butter will remain in solution.

7. The process of precluding fat and sugar bloom in chocolate and chocolate products comprising subjecting at least a part of the cocoa butter content of such chocolate or chocolate products while in the liquid phase and before hardening, to the action of a dispersion of an aqueous solution of nitrous acid in a water-miscible liquid organic fat solvent and at a temperature within the range of 10° C. to 40° C., and in the presence of a liquid organic fat solvent for the cocoa butter which is inert to the acid in the presence of the cocoa butter.

8. The process of isomerizing a natural fat containing glyceryl esters of oleic acid comprising forming a solution of said fat in a liquid organic fat solvent, forming a dispersion of an aqueous solution of nitrous acid in a water-miscible liquid organic fat solvent, said solvents being miscible with each other and being inert with respect to the acid in the presence of the fat, bringing the temperature of the fat solution within the temperature range of 10° C. to 40° C., bringing the dispersion of nitrous acid to a temperature within the range of −40° C. to −20° C., and mixing said solutions.

9. The process of isomerizing a natural fat containing glyceryl esters of oleic acid comprising forming separate solutions of said fat and of an aqueous solution of nitrous acid in liquid organic fat solvents, said solvents being miscible with each other and inert with respect to the acid in the presence of said fat and the solvent for the nitrous acid solution being miscible with water, and mixing said solutions together while maintaining the temperature of the reaction below the temperature at which the isomerized fat will remain in solution, so that said isomerized fat will solidify and be thrown out of solution.

10. The process of isomerizing a natural fat containing glyceryl esters of oleic acid comprising forming a solution of said fat in a liquid organic fat solvent medium, forming a dispersion of an aqueous solution of nitrous acid in a water-miscible liquid organic fat solvent medium, said solvent media being miscible with each other and inert to the acid in the presence of the fat, and mixing the solution of said fat and the dispersion of said acid, with agitation, while maintaining the temperature of the resulting reaction below the point at which the isomerized fat will remain in solution.

11. The process of isomerizing a natural fat containing glyceryl esters of oleic acid comprising forming separate solutions of said fat and of an aqueous solution of nitrous acid in liquid organic fat solvent media, said media being inert with respect to nitrous acid in the presence of said fat, and miscible with each other and the solvent media for the nitrous acid being water-miscible, and mixing said solutions together while maintaining the temperature of the reaction below the temperature at which the isomerized fat will remain in solution.

WILLIAM R. EIPPER.

REFERENCES CITED

The following references are of record in the file of this patent:

UNITED STATES PATENTS

| Number | Name | Date |
| --- | --- | --- |
| 2,119,141 | Ralston | May 31, 1938 |
| 2,216,660 | Cook et al. | Oct. 1, 1940 |
| 2,310,225 | Eipper | Feb. 9, 1943 |

OTHER REFERENCES

The Oil and Colour Trades Journal, Oct. 28, 1938, pages 1227–9, Bertram.